(No Model.) 3 Sheets—Sheet 3.
J. L. HOUSE.
Ditching Plow.
No. 242,450. Patented June 7, 1881.
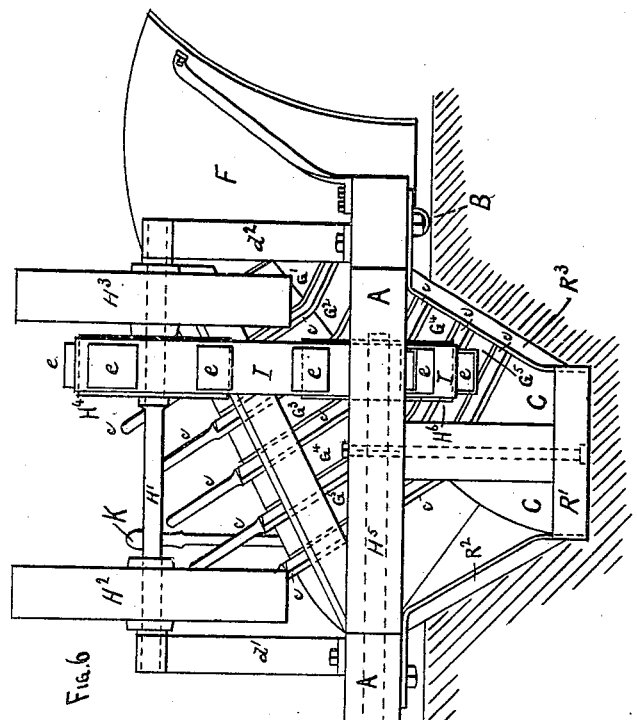
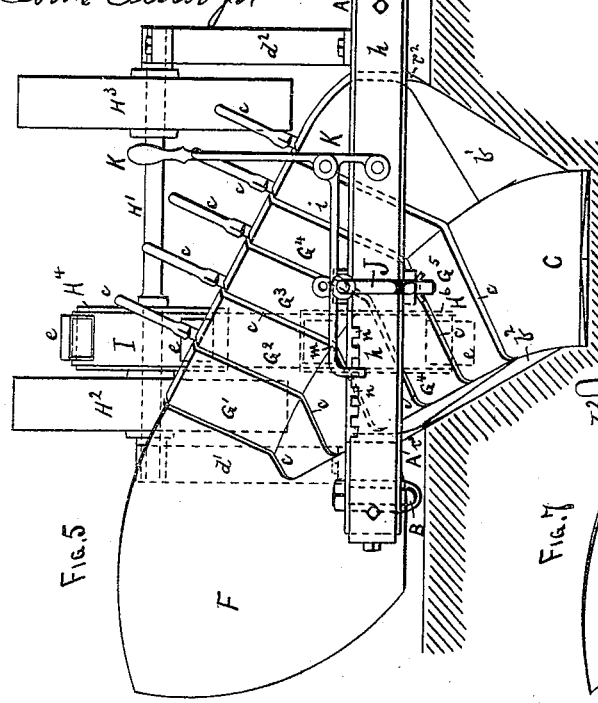
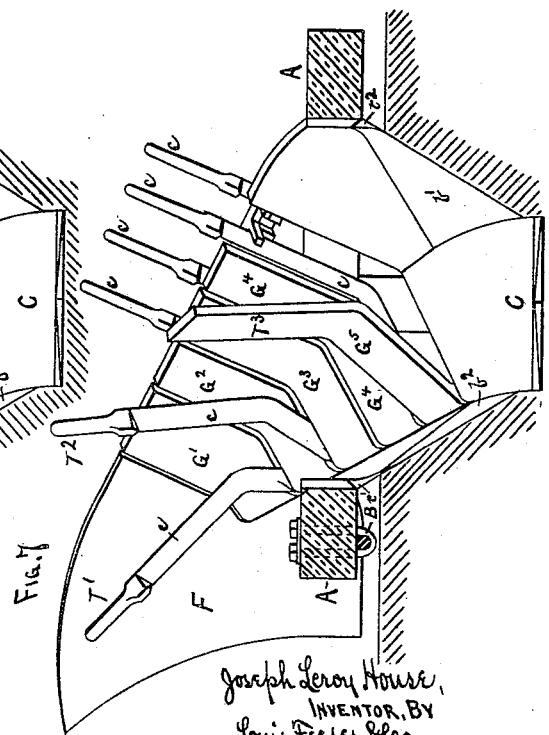

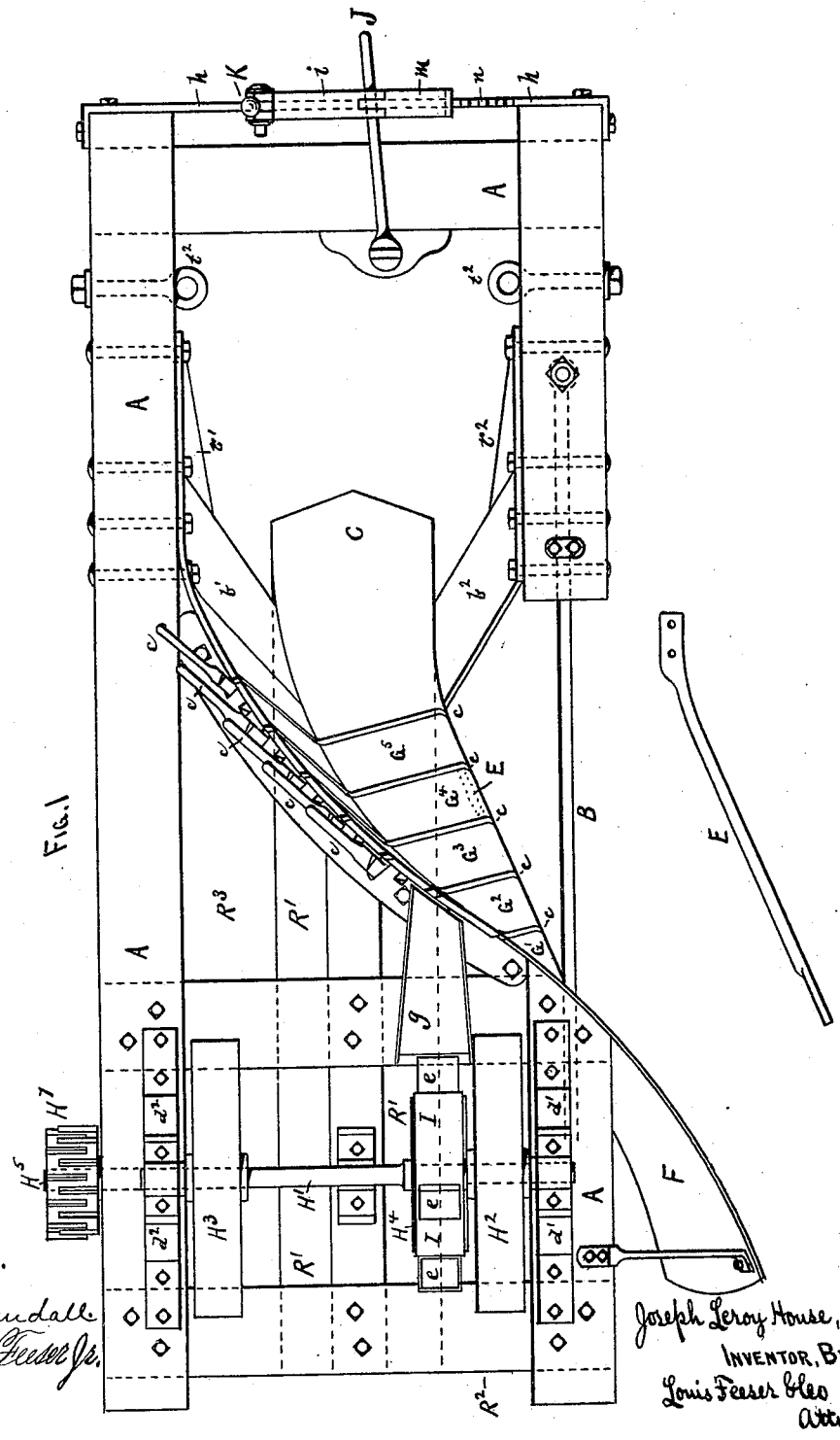

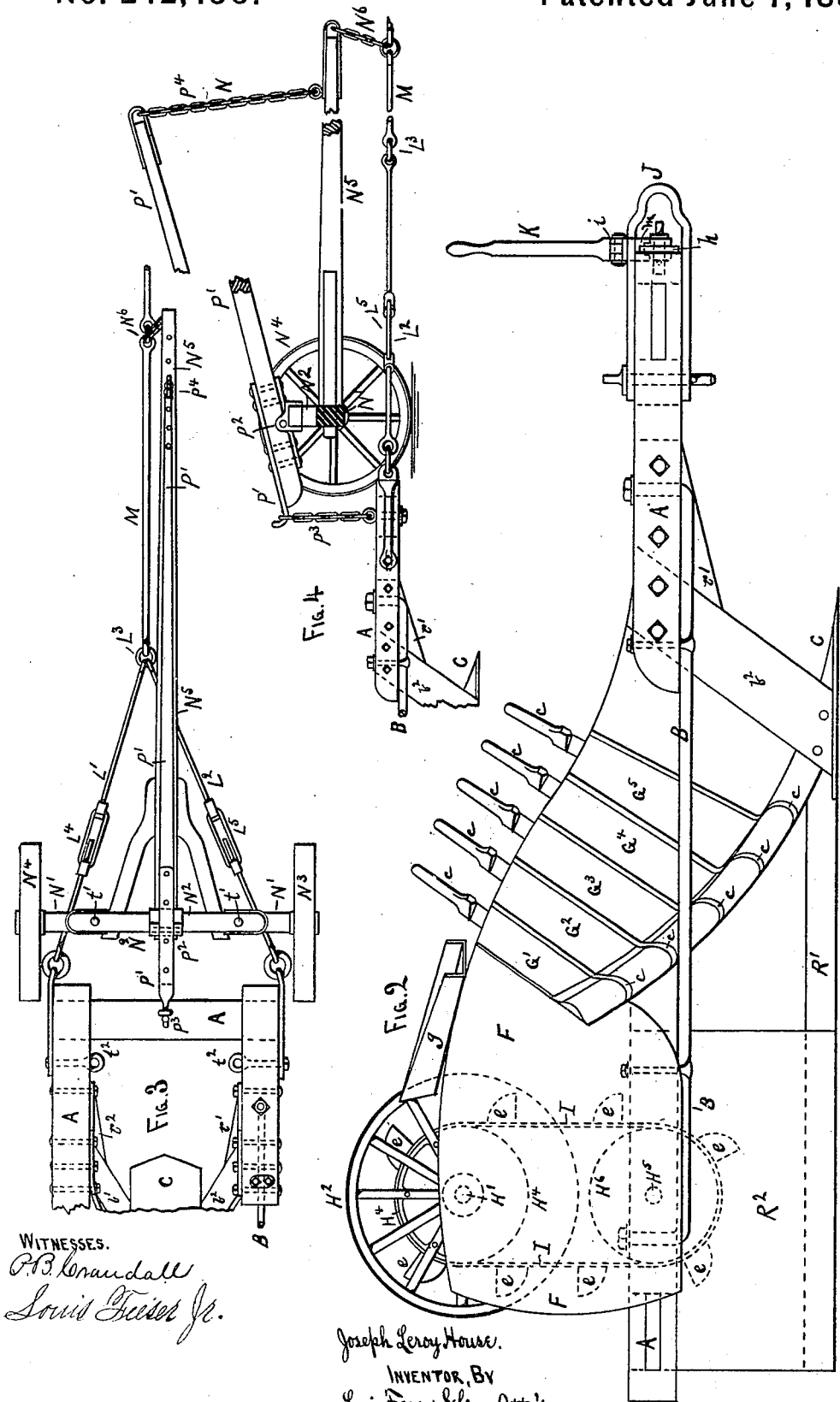

UNITED STATES PATENT OFFICE.

JOSEPH L. HOUSE, OF WINNIPEG, MANITOBA, CANADA.

DITCHING-PLOW.

SPECIFICATION forming part of Letters Patent No. 242,450, dated June 7, 1881.

Application filed February 28, 1881. (No model.)

*To all whom it may concern:*

Be it known that I, JOSEPH LEROY HOUSE, a subject of the Queen of Great Britain and Ireland, and a resident of Winnipeg, in the Province of Manitoba, Canada, have invented certain new and useful Improvements in Ditching-Plows, of which the following is a specification.

This invention relates to implements for forming ditches in wet lands, &c., and for railroad and other work; and it consists in forming a portion of the mold-board into hinged sections and arranging between said sections a series of knives or cutters, whereby the earth, when it becomes clogged upon the plow, may be cut up into narrow strips by the knives, and these strips thrown off by the hinged sections to clear the plow, as hereinafter shown.

The invention further consists in the arrangement, in the rear of the mold-board, of an endless belt provided with buckets and adapted to be run over suitable pulleys by a ribbed wheel traveling on the ground alongside the ditch as a motor, by which a stream of water is kept flowing upon the mold-board to keep the earth from sticking thereto, as hereinafter shown.

The invention further consists in a truck attached adjustably to the forward end of the frame of the plow, whereby it may be held at any desired elevation and the depth of cut regulated, and also in arranging upon the upper shaft of the water-elevator two or more large wheels, so that when the plow is removed from the ground and turned over upon its top these wheels may be utilized, in connection with said truck, to easily and readily transport the plow from place to place, as hereinafter shown.

The invention further consists in the manner of arranging a clevis on the forward end of the frame of the plow, whereby the draft may be regulated, as hereinafter shown.

The invention further consists in forming the bottom part of the plow in the rear of the mold-board to conform to the shape of the ditch being cut, to serve as a guide to steady the share and keep the plow running true, as hereinafter shown.

I accomplish these results by means of the mechanism illustrated by the accompanying drawings, in which—

Figure 1 is a plan view of the plow complete, except the supporting-truck, and Fig. 2 is a side elevation of the same. Fig. 3 is a plan view, and Fig. 4 is a side elevation reduced, of a portion of the front end of the frame of the plow and the supporting-truck, showing the manner of using the same, and also showing a variation in the form of the clevis. Fig. 5 is a front elevation, and Fig. 6 is a rear elevation, of Figs. 1 and 2. Fig. 7 is a front elevation of the mold-board, showing the manner of operating the hinged sections and cutting-knives.

A is the frame, made in the form shown, and with one side cut away and replaced by a rod, B, over which the earth runs, the rod forming less obstruction than the solid frame A would.

C is the nose or share of the plow, formed slightly pointed, as shown, and running upward and backward a short distance, and having attached to its rear sides angular plates $b'$ $b^2$, connecting it to the inside of the frame A, the front edges of these plates being sharp to form cutters for the sides, while the front edge of the share C forms the bottom of the ditch.

Attached to one side of the upper end of the share C is a rod, E, running backward and upward and off to one side, and connected by its opposite end to a nearly perpendicular curved plate, F.

$G'$ $G^2$ $G^3$ $G^4$ $G^5$ are a number of plates hinged, by their lower ends, to the rod E, and completely filling the space between the share C and curved plate F, except narrow slits between each pair of sections, into which angular knives $c$ are hinged, by their lower ends, to the same rod, E, and with the rear end of the first section, $G^5$, bent upward to conform to the angle of the cutting-plate $b'$, while the last section, $G'$, is bent upward to conform to the perpendicular plate F, the intermediate sections being gradually bent and curved between the share C and plates $b'$ and F, as shown, the share C, angular plate $b'$ and sections $G'$ $G^2$ $G^3$ $G^4$ $G^5$, and the perpendicular plate F forming a mold-board which gradually curves upward, backward, and off to one side, to carry the earth to one side and lay it in a ridge alongside of the ditch.

$H'$ is a shaft mounted in suitable bearings, $d'$ $d^2$, across the frame A, in the rear of the mold-board, and having journaled thereon two large wheels, $H^2$ $H^3$, and a smaller pulley, $H^4$.

Beneath the shaft $H'$, through the center of the frame A, another shaft, $H^5$, is journaled, and carrying a pulley, $H^6$, corresponding to the pulley $H^4$, and over which two pulleys a belt, I, having buckets $e$, is arranged, while a ribbed wheel, $H^7$, on the shaft $H^5$, outside the frame A, adapted to run upon the ground at the side of the ditch, furnishes the necessary power to run the pulleys and belt.

$g$ is a spout running from the front of the bucket-belt to the rear of the sections $G'$ $G^2$ $G^3$ $G^4$ $G^5$, so that water elevated by the buckets $e$ may be run in behind or over the front of the sections to keep them wet and prevent the earth sticking to them.

J is a clevis or pull-iron attached to the front of the frame A, to which the cable for operating the plow is connected.

Bolted across the front of the frame A, and running between the sides of the clevis J, is a strap or plate, $h$, to which a hand-lever, K, is pivoted.

$i$ is a rod pivoted at one end to the hand-lever K and at the other to the clevis J, so that the clevis may be moved from side to side by the lever, while a dog, $m$, pivoted at one end to the clevis, and adapted to catch into notches $n$ in the strap $h$, serves to hold the clevis at any desired point to regulate the draft.

In Figs. 3 and 4 another form of draft-regulator is shown, consisting of two rods, $L'$ $L^2$, leading from either side of the frame A to a ring, $j^3$, in which the cable M for moving the plow is attached. Swivel-joints $L^4$ $L^5$ are arranged in each rod $L'$ $L^2$, by which the latter may be shortened or lengthened to regulate the draft; but I prefer the form shown in Figs. 1, 2, and 5.

$N'$ is an axle, having a swivel bolster, $N^2$, wheels $N^3$ $N^4$, and tongue $N^5$, forming a truck arranged in the ordinary manner of the forward axle and wheels of a wagon. This truck will be placed just in front of or immediately above the front end of the frame A, as shown in Figs. 3 and 4, and the tongue $N^5$ connected by a chain or other adjustable fastening, $N^6$, to the cable M, so that the truck will be moved along with the plow.

$P'$ is a long lever, pivoted at $P^2$, near one end, upon top of the bolster $N^2$, and connected at the end by a chain or other adjustable fastening, $P^3$, to the front of the frame A, while the upper end is connected by a chain, $P^4$, to the forward end of the tongue $N^5$, so that by adjusting the chains $P^3$ $P^4$ higher or lower the front of the frame A may be adjusted higher or lower with relation to the wheels $N^3$ $N^4$, as hereinafter set forth.

$R'$ is a board or plate the same width as the share C, and running back from and on a line with the lower side of the share, and adapted to move along the bottom of the ditch after it is cut, and having angular sides $R^2$ $R^3$, connecting its rear outer edges with the inside edges of the frame A, as shown in Figs. 1, 2, and 6, these three parts—viz., the bottom plate, $R'$, and sides $R^2$ $R^3$—conforming to the side cutters, $b'$ $b^2$, and share C, and thus completely filling the ditch after it is cut, to form a guide to hold the rear of the frame A in place and prevent the strain upon the mold-board from throwing it around, as hereinafter shown.

$r'$ $r^2$ are small colters or grass-cutters attached to the front of the upper part of the side cutters, $b'$ $b^2$, and to the frame A, so that they form long slanting cutters to cut through the sod, &c., before the side cutters act, to aid in the work and reduce the amount of power required to move the plow. These colters will be made so as to be readily removable for sharpening, &c.

In forming ditches with this machine the line is first laid out, and "sighting-stakes" set at convenient distances apart. A windlass is then set on the "line" two hundred or three hundred feet from the commencement of the ditch, and the plow set at the latter point and connected by ropes, chains, wire cables, jointed rods, or other means to the windlass, and the share C forced into the ground by bearing down on the front end of the frame A and starting the windlass, when the plow will be very soon drawn into the ground. The truck is then placed in position as before described, and the lever $P'$ adjusted to the proper point to regulate the depth of cut it is desired to make. The windlass is then started and the plow drawn through the ground, the earth being forced upward and backward and off to one side by the share and mold-board and laid over in a ridge alongside of the ditch, the rod B offering no obstruction thereto. The strain being very heavy against the back of the mold-board, the tendency of the plow is to be thrown off to the opposite side; but by means of the bottom plate, $R'$, and angular sides $R^2$ $R^3$ the plow is guided and kept in a straight line.

The clevis J, it will be observed, is set a short distance to one side to assist in counteracting this tendency to run to one side, and by adjusting it by the lever K and dog $m$ the plow may be kept running in a perfectly straight line.

In cutting ditches in clay or other heavy soil the plow soon becomes clogged and choked, and sticks to the mold-board. Heretofore this clogged earth has been removed by shoveling, &c.; but by forming the mold-board with the sections $G'$ $G^2$ $G^3$ $G^4$ $G^5$ and providing the knives $c$, when this clogging occurs, the knives are pulled down through the earth, as shown at $T'$ $T^2$ in Fig. 7, thus cutting the earth into strips the width of the sections, and then the latter are thrown over, as shown at $T^3$ in Fig. 7, carrying the earth with them and very quickly removing it and clearing the plow. The knives and sections are then returned to their places and the plow again started. By this means the annoyance of choking and clogging is avoided, as the work of clearing the plow by this means is very slight.

Another source of annoyance is the sticking of some kinds of earth to the mold-board, requiring the constant application of water to keep the mold-board clear; but by means of the belt I and buckets $e$ a constant stream of water may be kept flowing upon any part of the mold-board, ditching being always done in wet soil, so that plenty of water gathers in the ditch as fast as it is cut, to supply the buckets.

When it is desired to remove the plow from the ground the lever P' is forced down to create an upward strain upon the nose of the share C, which will cause it to take an upward course as the plow is drawn ahead, and thus gradually remove it from the ground.

When it is desired to move the plow from place to place the truck is removed and the machine turned over upon its top, so that the rear end rests upon the wheels $H^2$ $H^3$, and then when the truck is placed beneath the forward end and secured thereto by the pins $t'$ on the bolster $N^2$, being set through eyebolts $t^2$ on the frame A, or by any other well-known fastening, a wagon is formed by which the plow may be readily and easily transported. Provision may also be made for carrying the windlass-cable, &c., upon the plow when thus arranged.

As many of the mold-board sections may be used as desired, and they may be made of any size, shape, or width. The sections will not be made to fit closely together, so that small spaces will be left through which the water may percolate to assist the buckets $e$ in keeping the mold-board wet.

If desired, the side cutters, $b'$ $b^2$, and share C, and bottom R', and sides $R^2$ $R^3$ may be made adjustable, to enable the same plow to be adapted to different-sized ditches.

Having thus described my invention, what I claim as new is—

1. In ditching-plows, &c., a mold-board a portion of which is composed of hinged sections adapted to be thrown outward to remove the earth when the plow becomes clogged, substantially as set forth.

2. The combination and arrangement of the share C, hinged sections $G'$ $G^2$ $G^3$ $G^4$ $G^5$, and hinged cutters $c$, substantially as set forth.

3. The combination and arrangement of the share C, movable sections $G'$ $G^2$ $G^3$ $G^4$ $G^5$, and curved plate F, substantially as set forth.

4. The combination, with the mold-board, of an endless belt, I, having the buckets $e$ and adapted to be revolved, whereby a stream of water may be kept flowing upon the mold-board, substantially as set forth.

5. The frame A, carrying the plow, and a wheeled truck located in front thereof, in combination with cable M, connecting the frame and truck, and a pivoted lever, P', connected at one end by an adjustable fastening to the frame A and at the other end by a like fastening to the tongue of the truck, whereby the parts will operate as set forth.

6. The frame A, having the wheels $H^2$ $H^3$ journaled above its rear end, in combination with a wheeled truck connected with frame A, and adapted, when said frame is reversed, to fit under the forward part of the frame and form, in connection with wheels $H^2$ $H^3$, a wheeled support for the frame, substantially as set forth.

In testimony whereof I have hereunto set my hand in the presence of two subscribing witnesses.

JOSEPH LEROY HOUSE.

Witnesses:
C. N. WOODWARD,
LOUIS FEESER, Sr.